Patented Aug. 20, 1929.

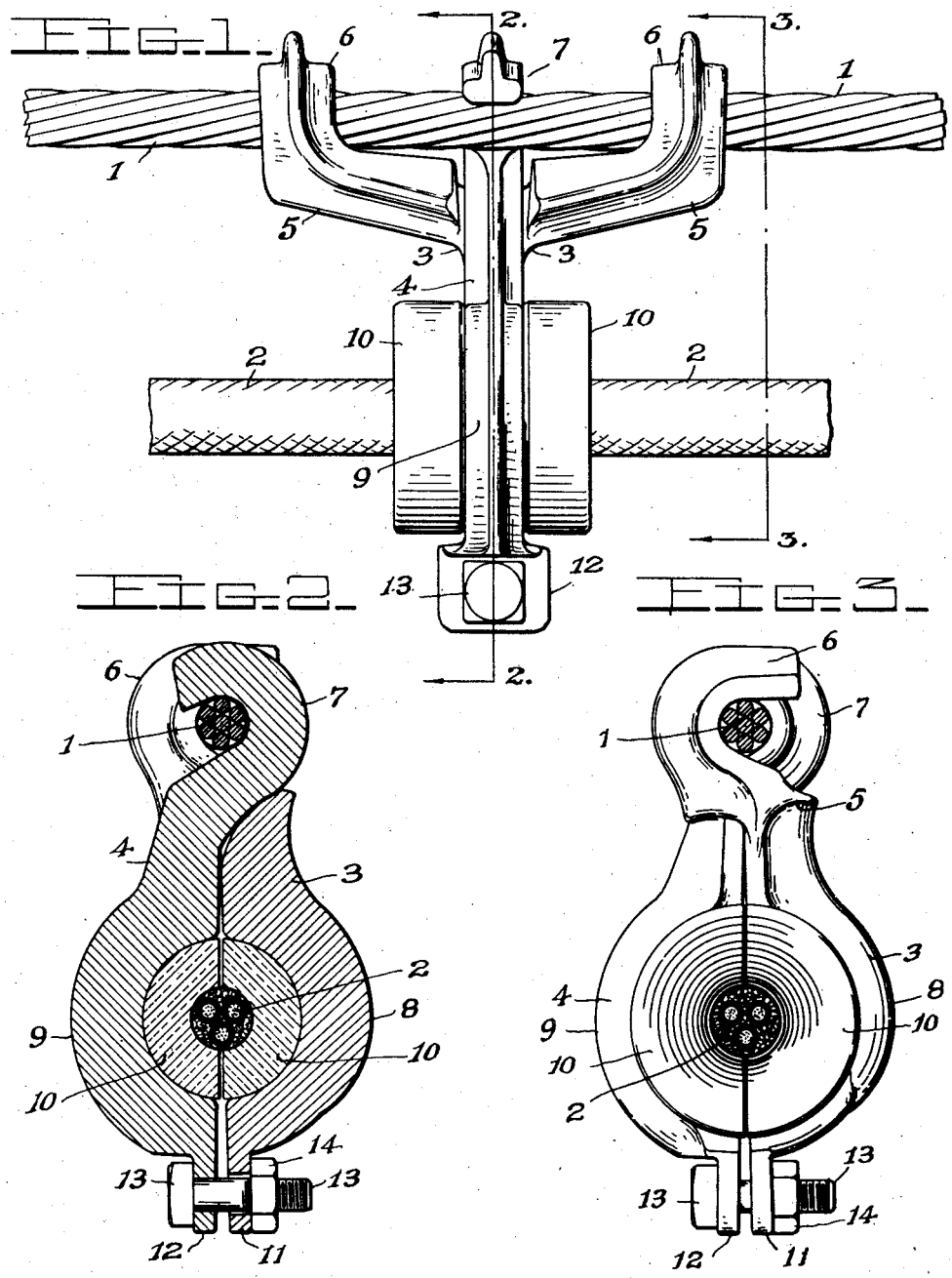

1,725,119

UNITED STATES PATENT OFFICE.

ROLLAND G. WILLIAMS, OF BRANFORD, CONNECTICUT, ASSIGNOR TO MALLEABLE IRON FITTINGS COMPANY, OF BRANFORD, CONNECTICUT A CORPORATON OF CONNECTICUT.

CLAMP FOR SUPPORTING ELECTRIC CONDUCTORS.

Application filed June 13, 1928. Serial No. 285,194.

This invention relates to clamps for the purpose of supporting an electrical conductor in fixed suspension from a messenger cable, and has for its object to prevent any shifting or movement of the suspensory means, such as is usually caused by the elements and to thereby prevent fraying of the insulation of the electrical conductor.

In the accompanying drawing which forms a part of this application

Figure 1 is an elevation illustrating the position of parts when the improvement is in use—

Figure 2 is a section at the line 2—2 of Figure 1, and

Figure 3 is a section at the line 3—3 of Figure 1.

Similar numerals of reference denote like parts in the several figures of the drawing.

1 is the messenger cable, and 2 designates the electrical conductor.

The improved clamp comprises two members 3 and 4, the upper portion of the member 3 having lateral branches 5 which terminate in open hooks 6 that engage the cable 1 at spaced locations, and the member 4 terminates at its upper extremity in an open hook 7 which engages the cable 1 on the opposite side to that engaged by the hooks 6 and this hook 7 engages the cable at a point intermediate of the hooks 6.

The members 3 and 4 have enlarged portions 8, 9, which surround insulating sections 10 the latter embracing the conductor 2.

The lower extremities of these members 3 and 4 terminate in ears 11 and 12 which are normally spaced apart, and a bolt 13 is passed through these ears and a nut 14 driven on the free end of the bolt whereby these ears may be forced together, thereby causing the portions 8, 9, of the members 3 and 4 to tightly clamp the insulator sections 10 against the conductor 2, and at the same time cause the hooks 6, 7, to bind firmly against the cable 1.

These hooks contact the cable 1 after the manner of sister-hooks, and it will be apparent that these clamping members 3 and 4 are fulcrumed on the insulator sections 10, so that it will be clear that a good clamping effect is brought about both against the cable 1 and the conductor 2.

What is claimed is:—

1. A clamp for supporting an electrical conductor in fixed suspension from a messenger cable, comprising two members one of which has spaced open hooks at its upper end while the other member has at its upper end a single hook, said hooks being crossed and embracing the cable in sister-hook relation, a sectional insulator which embraces the conductor and is surrounded by the clamping members, and means for forcing the lower ends of said members toward each other whereby said hooks are bound to the cable and the insulator bound to the conductor.

2. A clamp for suspending an electrical conductor from a messenger cable, comprising metal members one of which is formed with spaced open hooks that embrace the cable, the other member formed with a single open hook that embraces the cable intermediate the spaced hooks in opposed and crossed relation to the latter, said members formed into clamping jaws at their lower ends which terminate in parallel ears, a sectional insulator embraced by said jaws and surrounding said conductor, and means for forcing said ears toward each other whereby said hooks will be clamped against the cable and the insulator caused to firmly hug the conductor.

In testimony whereof I affix my signature hereto.

ROLLAND G. WILLIAMS.